(12) United States Patent
Meyer et al.

(10) Patent No.: US 9,605,129 B2
(45) Date of Patent: Mar. 28, 2017

(54) POLYMER COMPOSITION HAVING HEAT-ABSORBING PROPERTIES AND IMPROVED COLOUR PROPERTIES

(71) Applicant: Bayer MaterialScience AG, Leverkusen (DE)

(72) Inventors: Alexander Meyer, Düsseldorf (DE); Gunther Stollwerck, Krefeld (DE); Sven Gestermann, Leverkusen (DE); Klaus Horn, Dormagen (DE); Birgit Meyer Zu Berstenhorst, Moers (DE); Joerg Reichenauer, Krefeld (DE); Andrea Scagnelli, Bonate Sotto (IT); Gianmaria Malvestiti, Brembate (IT); Massimo Tironi, Treviolo (IT)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/527,222

(22) Filed: Oct. 29, 2014

(65) Prior Publication Data

US 2015/0050484 A1 Feb. 19, 2015

Related U.S. Application Data

(63) Continuation of application No. 13/104,197, filed on May 10, 2011, now abandoned.

(30) Foreign Application Priority Data

May 10, 2010 (IT) .............................. RM2010A0225

(51) Int. Cl.
| | | |
|---|---|---|
| C08K 3/38 | (2006.01) | |
| C08K 5/50 | (2006.01) | |
| C08K 3/04 | (2006.01) | |
| C08K 3/00 | (2006.01) | |

(52) U.S. Cl.
CPC .............. *C08K 3/38* (2013.01); *C08K 3/0033* (2013.01); *C08K 3/04* (2013.01); *C08K 5/50* (2013.01); *C08K 2201/011* (2013.01); *Y10T 428/25* (2015.01); *Y10T 428/2982* (2015.01)

(58) Field of Classification Search
None
See application file for complete search history.

(56) References Cited

U.S. PATENT DOCUMENTS

| | | |
|---|---|---|
| 2,991,273 A | 7/1961 | Hechelhammer et al. |
| 2,999,825 A | 9/1961 | Floyd et al. |
| 2,999,846 A | 9/1961 | Schnell et al. |
| 3,028,635 A | 4/1962 | Herubel |
| 3,148,172 A | 9/1964 | Fox |
| 3,271,367 A | 9/1966 | Schnell et al. |
| 4,101,513 A | 7/1978 | Fox et al. |
| 4,395,463 A | 7/1983 | Kray |
| 4,707,393 A | 11/1987 | Vetter |
| 4,982,014 A | 1/1991 | Freitag et al. |
| 5,041,313 A | 8/1991 | Patel |
| 5,288,778 A | 2/1994 | Schmitter et al. |
| 5,391,795 A | 2/1995 | Pickett |
| 5,627,256 A | 5/1997 | Meier et al. |
| 5,712,332 A | 1/1998 | Kaieda et al. |
| 5,821,380 A | 10/1998 | Holderbaum et al. |
| 5,846,659 A | 12/1998 | Lower et al. |
| 5,869,185 A | 2/1999 | Bahr et al. |
| 5,883,165 A | 3/1999 | Krohnke et al. |
| 6,350,512 B1 | 2/2002 | Hurley et al. |
| 6,680,350 B1 | 1/2004 | Dobler |
| 7,148,313 B2 * | 12/2006 | Koga et al. ................... 528/196 |
| 7,442,430 B2 | 10/2008 | Buckel et al. |
| 2003/0022967 A1 | 1/2003 | Dobler et al. |
| 2003/0187111 A1 | 10/2003 | Staniek |
| 2004/0131845 A1 | 7/2004 | Fujita |
| 2004/0228920 A1 | 11/2004 | Boudreau et al. |
| 2005/0095433 A1 | 5/2005 | Bogerd et al. |
| 2005/0158555 A1 | 7/2005 | Anders et al. |
| 2005/0161642 A1 | 7/2005 | Takeda |
| 2006/0178254 A1 | 8/2006 | Takeda et al. |
| 2006/0234061 A1 | 10/2006 | Buckel et al. |
| 2006/0251996 A1 | 11/2006 | Bogerd et al. |
| 2007/0015081 A1 | 1/2007 | van den Bogerd et al. |
| 2008/0026205 A1 | 1/2008 | Sasaki et al. |
| 2008/0075936 A1 | 3/2008 | McGurran et al. |
| 2009/0136730 A1 * | 5/2009 | Nakano et al. ............... 428/220 |

FOREIGN PATENT DOCUMENTS

| | | |
|---|---|---|
| CA | 2093686 A1 | 11/1993 |
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 2804283 A1 | 8/1978 |
| DE | 3121385 A1 | 8/1982 |
| DE | 3832396 A1 | 2/1990 |
| DE | 10392543 T5 | 4/2005 |
| EP | 0110221 A2 | 6/1984 |
| EP | 0110238 A2 | 6/1984 |

(Continued)

*Primary Examiner* — Cheng Huang
(74) *Attorney, Agent, or Firm* — Drinker Biddle & Reath LLP

(57) ABSTRACT

An embodiment of the present invention relates to a composition comprising a) at least one transparent thermoplastic material; b) at least one inorganic IR absorber comprising at least one boride compound present in an amount of from 0.0015 wt. % to 0.015 wt. %, calculated as solids content of boride in the total polymer composition; and c) at least one inorganic, nano-scale pigment present in an amount of from 0.0008 wt. % to 0.0035 wt. %, based on the total composition; and d) optionally further additives.

10 Claims, 1 Drawing Sheet

(56) References Cited

FOREIGN PATENT DOCUMENTS

| | | | |
|---|---|---|---|
| EP | 0339623 | A1 | 11/1989 |
| EP | 0500496 | A1 | 8/1992 |
| EP | 0570165 | A2 | 11/1993 |
| EP | 0716919 | A2 | 6/1996 |
| EP | 0718354 | A2 | 6/1996 |
| EP | 0839623 | A1 | 5/1998 |
| EP | 1308084 | A1 | 5/2003 |
| EP | 1559743 | A1 | 8/2005 |
| EP | 1801815 | A1 | 6/2007 |
| EP | 1865027 | A1 | 12/2007 |
| EP | 2009057 | A1 | 12/2008 |
| FR | 1561518 | A | 3/1969 |
| GB | 1122003 | A | 7/1968 |
| GB | 1229482 | A | 4/1971 |
| GB | 1341318 | A | 12/1973 |
| GB | 1367790 | A | 9/1974 |
| GB | 1467901 | A | 3/1977 |
| JP | 06240146 | A | 8/1994 |
| JP | 2003-277045 | A | 10/2003 |
| JP | 2006-219662 | A | 8/2006 |
| JP | 2008-024902 | A | 2/2008 |
| JP | 2008-150548 | A | 7/2008 |
| JP | 2008-214596 | A | 9/2008 |
| JP | 2009258581 | A | 11/2009 |
| WO | WO-9615102 | A2 | 5/1996 |
| WO | WO-01/18101 | A1 | 3/2001 |
| WO | WO-2006/108520 | A1 | 10/2006 |
| WO | WO 2006103906 | A1 * | 10/2006 |
| WO | WO-2007008476 | A1 | 1/2007 |
| WO | WO-2008071363 | A2 | 6/2008 |
| WO | WO-2008/109072 | A1 | 9/2008 |
| WO | WO-2009/059901 | A2 | 5/2009 |

* cited by examiner

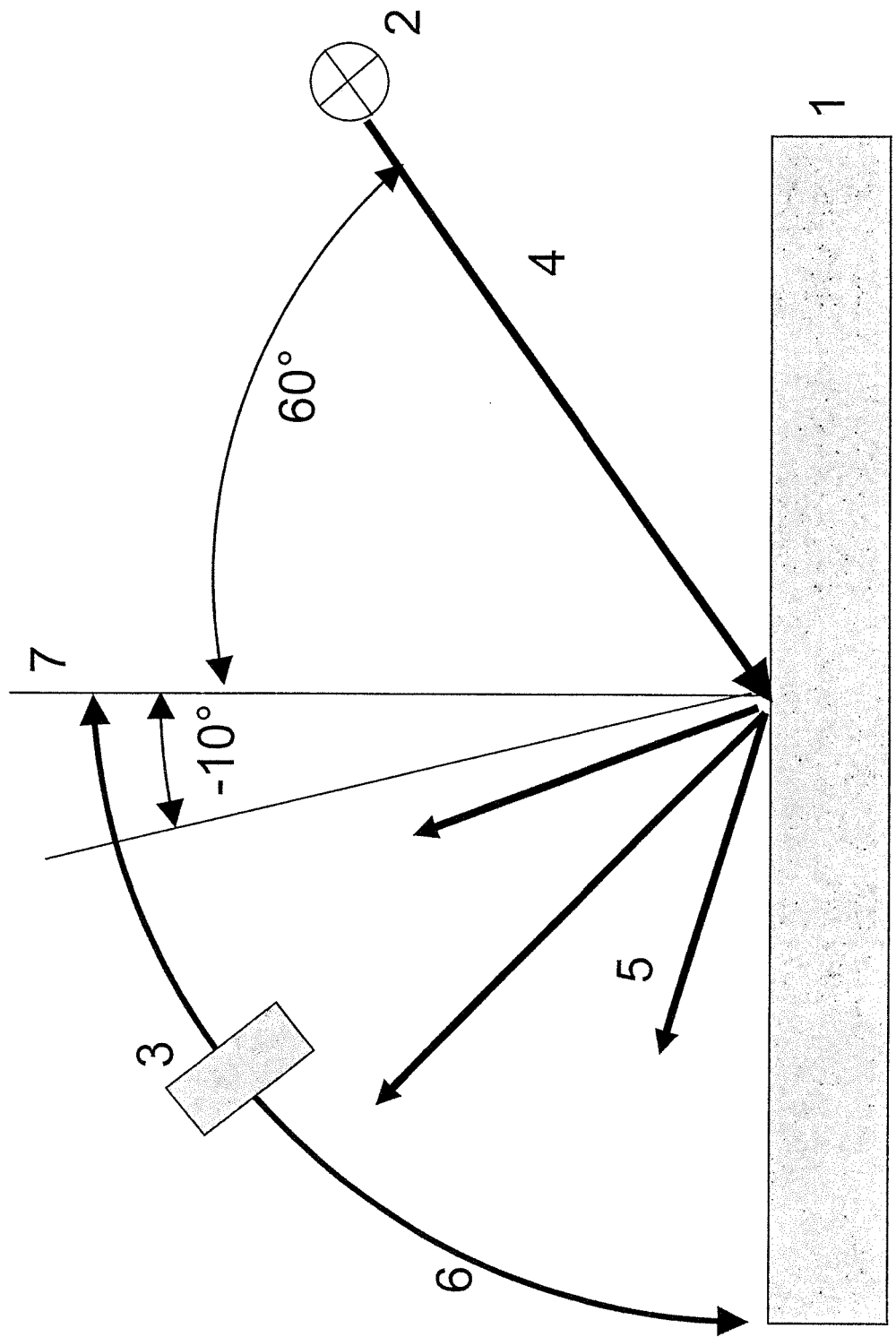

POLYMER COMPOSITION HAVING HEAT-ABSORBING PROPERTIES AND IMPROVED COLOUR PROPERTIES

CROSS REFERENCE TO RELATED APPLICATIONS

This application is a continuation of U.S. patent application Ser. No. 13/104,197, filed May 10, 2011, which claims benefit of Italian Patent Application No. RM2010A000225, filed May 10, 2010.

BACKGROUND

Glazing made from compositions containing transparent thermoplastic polymers such as, for example, polycarbonate offer many advantages over conventional glazing made of glass for use in the automotive sector and for buildings. Such advantages include, for example, increased break resistance and/or an increased weight saving, which in the case of automotive glazing permit greater safety for the occupants in the event of road traffic accidents and a lower fuel consumption. Finally, transparent materials containing transparent thermoplastic polymers permit substantially greater freedom in terms of design because they are easier to mould.

It is a disadvantage, however, that the high heat transmissibility (i.e. transmissibility for IR radiation) of transparent thermoplastic polymers leads to undesirable heating of the inside of motor vehicles and buildings under the action of the sun. The raised temperatures on the inside reduce the comfort for the occupants or residents and can involve increased demands in terms of air conditioning, which in turn increase the energy consumption and thus eliminate the positive effects again. In order nevertheless to meet the demand for low energy consumption coupled with a high degree of comfort for the occupants, glazing provided with appropriate heat protection is required. This is true for the automotive sector in particular.

As has long been known, the largest part of solar energy, apart from the visible range of light between 400 nm and 750 nm, is accounted for by the near-infrared (NIR) range between 750 nm and 2500 nm. Penetrating solar radiation is absorbed inside a car, for example, and emitted as long-wave heat radiation having a wavelength of from 5 µm to 15 µm. Because conventional glazing materials—in particular thermoplastic polymers that are transparent in the visible range—are not transparent in that range, the heat radiation is unable to radiate to the outside. A greenhouse effect is obtained and the interior heats up. In order to keep this effect to a minimum, the transmission of the glazing in the NIR should therefore be minimised as far as possible. Conventional transparent thermoplastic polymers such as, for example, polycarbonate are, however, transparent both in the visible range and in the NIR.

Additives, for example, which exhibit as low a transparency as possible in the NIR without adversely affecting the transparency in the visible range of the spectrum are therefore required.

Of the transparent thermoplastic plastics, polymers based on polymethyl methacrylate (PMMA) and polycarbonate are particularly suitable for use as a glazing material. Because of its high strength, polycarbonate in particular has a very good property profile for such uses.

In order to impart infrared-absorbing properties to these plastics, corresponding infrared absorbers are therefore used as additives. IR absorber systems which have a broad absorption spectrum in the NIR range (near-infrared, 750 nm-2500 nm) while at the same time having low absorption in the visible range (low inherent colour) are of particular interest for that purpose. The corresponding polymer compositions should additionally have high heat stability as well as excellent light stability.

A large number of IR absorbers based on organic or inorganic materials which can be used in transparent thermoplastics are known. A selection of such materials is described, for example, in J. Fabian, H. Nakazumi, H. Matsuoka, Chem. Rev. 92, 1197 (1992), in U.S. Pat. No. 5,712,332 or JP-A 06240146.

IR-absorbing additives based on organic materials frequently have the disadvantage, however, that they exhibit poor stability towards thermal stress or radiation. Accordingly, many of these additives do not have sufficient heat stability to be incorporated into transparent thermoplastics because temperatures of up to 350° C. are required for their processing. Moreover, during use, glazing is often exposed for prolonged periods to temperatures of more than 50° C., caused by solar radiation, which can lead to decomposition or degradation of the organic absorbents.

Furthermore, organic IR absorbers frequently do not have a sufficiently broad absorption band in the NIR range, so that their use as IR absorbers in glazing materials is inefficient, a pronounced inherent colour of such systems often also occurring, which is generally undesirable.

IR-absorbing additives based on inorganic materials are frequently markedly more stable as compared with organic additives. The use of such systems is often also more economical because in most cases they have a markedly more favourable price/performance ratio. Accordingly, materials based on finely divided borides, such as, for example, lanthanum hexaboride, have proved to be efficient IR absorbers because they have a broad absorption band in the IR range coupled with high heat stability.

IR-absorbing additives from the group of the borates are suitable for transparent thermoplastics such as polymethyl methacrylate and polycarbonate on account of the advantages described above. However, it has been shown that these additives lead to unexpected colour impressions in transparent thermoplastic compositions, irrespective of their inherent colour.

The colour impression of a non-transparent object is attributable to the reflected light. An object which, for example, absorbs the long-wave constituents of light appears blue because the remaining shorter-wave components of the spectrum are remitted. However, this application relates to transparent objects, such as, for example, window panels. Transparent objects are here understood as being bodies that exhibit a transmission of at least 6% and a haze of less than 3%, preferably less than 2.5%, more preferably less than 2.0%. In the case of transparent bodies, in contrast to non-transparent objects, it is normally not the remitted colour but the transmitted colour that is in the foreground.

The object thus acts as a colour filter. In order not to impair the transparency of the panel there are preferably used colouring agents which dissolve in the polymer matrix or have such a small particle size that they cause no haze, no haze within the scope of the present invention meaning a haze of less than 3% at a given layer thickness, measured in accordance with ASTM D1003.

The boride-based IR absorber particles that are used do not in fact lead to haze of the corresponding glazing element (haze<3%).

However, it has been found that, above a certain concentration, these particles, whose size is preferably within the nanometre range, can cause scattering effects in the matrix in which they are embedded, regardless of the nature and other properties of the particles. While this scattering has only an unnoticeable effect on the transmission and accordingly the transparency of the article, the colour impression of the article is in some cases changed considerably by the scattered light, in particular in dependence on the viewing angle.

Consequently, the IR-absorbing additives from the group of the borides lead to undesirable colour reflexes in the finished part, that is to say, for example, in a transparent panel, under certain light conditions and viewing angles. Thus, corresponding panels exhibit a bluish to violet tinge according to the concentration of the inorganic IR absorber used. As has been described, this colour impression is not the result of the colour of the chosen added pigments and absorbers but is attributable to scattering effects of the nanoparticles, which are to be observed in particular at viewing angles of from 1 to 60°. Such scattering can adversely affect the overall colour impression of the corresponding article, for example a vehicle or a building.

The scattering effect is, as described, frequently perceived as a bluish-violet colour. A neutral colour impression is frequently desirable, that is to say the natural colour impression is not disturbed by scattering effects. This means that the colour produced by the scattering effect must on the one hand be relatively close to the achromatic point and on the other hand close to the inherent colour of the component.

It must be emphasised that this colour effect is not caused by the normal absorbed or transmitted colour. This phenomenon is only caused by scattered light. Colourants or colouring pigments do not normally contribute to this colour effect. Only certain additives, such as, for example, the nano-scale boride-based IR absorbers, cause this effect. Furthermore, it must be pointed out that the scattering effect is pronounced only under certain light conditions and defined viewing angles. This is the case, for example, when the article—preferably a panel—is viewed under good light conditions, that is to say under solar radiation and at observation angles of from 1 to 60°.

The bluish scattering is caused by the IR additive, which consists of fine particles. These particles, which on average have a size, which can be determined, for example, by means of TEM (transmission electron microscopy), of preferably less than 200 nm, particularly preferably less than 100 nm, cause a scattering effect and can accordingly also lead to undesirable colour reflections. In order to minimise that effect, attempts could be made to reduce the diameter of the particles or to limit the amount of particles in the matrix. However, this is complex because the particles must be very finely ground and the risk of reagglomeration exists or, if the particle concentration is too low, the desired effect can no longer be achieved.

It is known that finely divided particles can cause so-called Rayleigh scattering. This Rayleigh scattering is described, for example, in C. F. Bohren, D. Huffmann, Absorption and scattering of light by small particles, John Wiley, New York 1983. The scattering behaviour of boride-based nanoparticles has not hitherto been described. The concentration ranges in which the described colour scattering effects occur were likewise hitherto not known. Measures for attenuating the described effect were not obvious from the current prior art.

Further, thermoplastic moulding compositions are known which contain both IR absorbers and colouring pigments, inter alia carbon blacks, in order to influence both the heat-absorbing properties and the colouration. However, measures for reducing the scattered radiation caused by boride-based IR-absorbing particles are as rarely described in the literature as that undesirable effect.

Compositions based on polycarbonate containing boride-based inorganic IR absorbers have been described in various publications.

DE 10392543 A1 describes transparent heat ray shielding foils which contain fine particles of hexaboride. The present invention, on the other hand, relates to compositions containing specific combinations of inorganic IR absorbers and inorganic pigment for reducing scattering effects.

US 2004/0028920 describes masterbatches containing boride-based inorganic IR absorbers for the production of moulded parts. US 2004/0028920 neither mentions scattering effects nor describes compositions which would reduce this effect. The use of carbon black is described in the general part of this application only as an agent for adjusting the colour, that is to say as a colouring agent.

EP 1 559 743 describes polymer compositions containing inorganic IR absorbers in combination with organic UV absorbers. However, this application does not describe the scattering effect described in the present invention. EP 1 559 743 gives no indication of how the scattering effect can be reduced.

Moulding compositions containing boride-based IR absorbers and specific carbon blacks are known from WO 2007/008476 A1, a synergistic effect in respect of the IR-absorbing properties being said to be achieved by the combination of these components. However, this application does not mention the effect described herein and gives no indication of how the problem described in the present application could be solved. WO 2007/008476 relates to materials which are suitable in particular for spectacles. The concentrations of colouring agents, inorganic IR absorbers and nano-scale inorganic pigments used therein are, however, completely different to those used in the present invention to solve the described problem in glazing, such as automotive or architectural glazing.

EP 1865027 A1 describes polymer compositions of specific polycarbonates, which additionally contain lanthanum hexaboride as IR absorber. EP 1865027 does not describe the problem described in the present invention, nor can the person skilled in the art see how the problem could be solved.

None of the above-mentioned documents describes scattering or reflection effects of inorganic IR absorbers in transparent thermoplastics and the problems resulting therefrom, and a solution to this problem s accordingly not rendered obvious either.

BRIEF DESCRIPTION OF THE DRAWINGS

FIG. 1 illustrates a measuring system for measuring scattering effects.

BRIEF DESCRIPTION OF SOME EMBODIMENTS

The invention relates to a polymer composition which absorbs infrared radiation (IR), containing a transparent thermoplastic plastic, an inorganic infrared absorber, also referred to as IR absorber hereinbelow, and at least one inorganic nano-scale pigment, and to the preparation and use of the polymer compositions according to the invention, and to products produced therefrom. In particular, the present invention relates to the reduction of undesirable scattering effects caused by boride-based inorganic IR absorbers, and to the use of the polymer composition according to the invention containing such IR absorbers in the production of glazing for use in buildings, motor vehicles and railway vehicles or aircraft.

An embodiment of the present invention is a composition comprising
a. at least one transparent thermoplastic material;
b. at least one inorganic IR absorber comprising at least one boride compound present in an amount of from 0.00150 wt. % to 0.01500 wt. %, calculated as solids content of boride in the total polymer composition; and
c. at least one inorganic, nano-scale pigment present in an amount of from 0.00080 wt. % to 0.00350 wt. %, based on the total composition; and
d. optionally further additives.

Another embodiment of the present invention is a masterbatch comprising
a. from 85.00 wt. % to 98.90 wt. % of a transparent thermoplastic material;
b. from 0.10 wt. % to 2.00 wt. % of a boride as inorganic IR absorber; and
c. from 1.00 wt. % to 4.80 wt. % of a dispersing agent;
d. optionally from 0.00 wt. % to 0.20 wt. % of at least one stabilizer selected from the group consisting of phosphines, phosphites and phenolic antioxidants and mixtures thereof;
e. optionally from 0.001 wt. % to 0.200 wt. % of an inorganic nano-scale pigment;
f. optionally from 0.00 wt. % to 8.00 wt. % of at least one further auxiliary substance and/or at least one additive, wherein the sum of components a to f is 100 wt. %.

A still further embodiment of the present invention is a method which comprises adding carbon black to a polymer composition which comprises nano-scale particles wherein the scattering caused by the nano-scale particles is reduced.

The object of the present invention was to provide transparent polymer compositions having no or low haze, good IR absorption and minimised colour effects by scattering, which compositions do not exhibit the disadvantages of the compositions known from the prior art.

It was a further object of the present invention to provide such compositions in the form of a masterbatch for further processing, as well as moulded parts produced using such compositions.

In order to detect and measure the scattering effects, test specimens are illuminated at an angle of incidence of 60° relative to the vertical using a white point light source with a small opening angle of less than 2° and the scattering is m easured at an emergent angle of from 30° to −80° relative to the vertical (see FIG. 1). Furthermore, the CIELAB colour coordinates L*, a*, b* are calculated in accordance with ASTM E 308 using illuminant D65 and a 10° observer. This colour system is described, for example, in Manfred Richter: Einführung in die Farbmetrik. 1984 ISBN 3-11-008209-8. For the evaluation of the colour, the b* value at an emergent angle of −10° is used. This b* value is referred to hereinbelow as b* (60°), the value of 60° relating to the angle of incidence.

The measurements were carried out using a "Gon360-105" goniophotometer (Gon360 with multichannel spectrometer CAS 140) from Instrument Systems. The measuring system is shown in FIG. 1, where the reference numerals have the following meanings
1 sample,
2 white light source,
3 detector with colour coordinate evaluation,
4 incident light at 60° relative to normal (perpendicular),
5 scattered and reflected light,
6 angle range in which the detector measures the colour, and
7 perpendicular direction of arrival (normal direction).

In addition, the hemispherical reflection of the test specimen is measured in accordance with ASTM E 1331, and the CIELAB colour coordinates L*, a*, b* are calculated in accordance with ASTM E 308 using illuminant D65 and a 10° observer. The corresponding b* value is denoted b*(hemispherical) hereinbelow.

A measure of the extent of the scattering effect is accordingly the measurement of the b* value in reflection (b* (60°) at which the scattered light is measured. The closer b* (60°) to zero, the lower the reflection in the blue range.

The b* (60°) value of the reflected light at an emergent angle of −10° of the moulded bodies according to the invention is preferably in the range from −2.5 to 0.0, more preferably from −2.3 to 0.0.

The limit of −2.5 or −2.3 for b* (60°) arises from the requirement that as neutral grey a colour as possible is required for automotive glazing, but the nanoparticles always cause a bluish scattering.

The absolute value of the value $\Delta b^*$, calculated from the difference between b* (60°) and the hemispherical reflection b*(hemispherical), which is less than 1.0 in the case of moulded bodies according to the invention.

The limit of $\Delta b^* < 1.0$ is given by the colour difference of delta E (calculated in accordance with DIN 6174) detectable by the human eye, which is less than 1.0. Because this scattering is substantially a bluish scattering, the calculation is here simplified to the difference $\Delta b^*$, which relates to the blue component of the light.

When studying the scattering behaviour it was found that the undesirable scattering effects are greatly dependent on the concentration of boride-based IR absorber in the polymer matrix.

Surprisingly, it has been shown that the increase in the scattered radiation, measured as the b* (60°) value, based on the IR absorber concentration used, is not linear. Thus, in the higher concentration range above 0.01000 wt. % (boride concentration), the relative increase in the scattered radiation is smaller than in the middle concentration range of from 0.00100 wt. % to 0.00500 wt. %. Accordingly, a pronounced increase in the scattered radiation is to be observed in the range from 0.00100 wt. % to 0.00500 wt. %, while the increase, surprisingly, diminishes at concentrations above 0.01000 wt. %.

Accordingly, the object of the present invention is achieved by compositions containing boride in a concentration range from 0.00150 wt. % to 0.01500 wt. %, in which the relative increase in the scattered radiation, measured as b* (60°), increases sharply with the boride concentration, in conjunction with an inorganic nano-scale pigment, preferably a nano-scale carbon black.

Surprisingly, it has been shown that certain inorganic nano-scale pigments reduce the undesirable scattering effect without markedly affecting the transparency and without changing the overall colour impression in a negative manner (neutral colour impression).

Other pigments and colourants, on the other hand, are less effective or ineffective or distort the original colour impression or, like organic colouring agents, are not stable in the long term and can thus lead to undesirable colour effects. Moreover, the additional use of colouring agents is expensive and accordingly not economical.

It has been found that certain carbon blacks in particular, preferably nano-scale carbon blacks, markedly reduce the described phenomenon of bluish scattering in specific concentration ranges. It was particularly surprising that even relatively low concentrations in the range of from 0.00080 wt. % to 0.00350 wt. % are sufficient to reduce the scattering effect significantly.

It was also surprising that only specific ratios of nano-scale carbon black to boride-based IR-absorbing additive reduce the scattering effect. Too high concentrations of carbon black drastically reduce the transmission (<6%) and change the inherent colour of the composition, while too low a concentration of carbon black has only an inadequate effect. The same is true of the concentration of boride-based IR absorbers.

Surprisingly, it has accordingly been found that the undesirable colour effects caused by scattering can be prevented or at least significantly reduced without impairing other physical properties such as transmission and haze only within a narrowly defined concentration range both of IR absorber and of nano-scale carbon black, or with a defined ratio of those components to one another.

Accordingly, the problem underlying the present invention is solved by compositions according to claim 1 based on thermoplastic materials containing defined concentrations of boride-based IR absorbers as well as specific concentrations of specific inorganic, preferably nano-scale, pigments. By means of those compositions, the bluish-violet colour caused by scattering could be reduced or changed to a more neutral colouration.

Further colouring agents are preferably used in the polymer compositions according to the invention, more preferably colouring agents based on anthraquinone, perinone or phthaloperinone, because glazing with a particular colouration is desirable especially in the automotive sector. It has been shown that the above-described scattering effect also occurs in such coloured polymer compositions when boride-based inorganic IR absorbers are added. Surprisingly, the scattering effect could be limited in such coloured compositions too by the use of specific concentrations of inorganic pigments.

The polymer compositions according to the invention contain:

a) a transparent thermoplastic plastic, preferably polycarbonate, copolycarbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copoly-methyl methacrylates such as polymethyl methacrylate, thermoplastic polyurethanes, more preferably polycarbonate, copolycarbonate, aromatic polyesters or polymethyl methacrylate, or mixtures of the mentioned components, and particularly preferably polycarbonate and copolycarbonate, b) an inorganic IR absorber from the group of the boride compounds of type MxBy (M=La, Ce, Pr, Nd, Tb, Dy, Ho, Y, Sm, Eu, ER, Tm, Yb, Lu, Sr, Ti, Zr, Hf, V, Ta, Cr, Mo, W and Ca, preference being given to lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride ($CrB$ and $CrB_2$), molybdenum boride ($MoB_2$, $Mo_2B_5$ and $MoB$), tungsten boride ($W_2B_5$), or combinations of these borides. Borides based on lanthanum hexaboride ($LaB_6$) or mixtures containing lanthanum hexaboride are most particularly preferred.

The borides are preferably used in an amount of from 0.00150 wt. % to 0.01500 wt. %, preferably from 0.00200 wt. % to 0.01100 wt. % and particularly preferably from 0.00270 wt. % to 0.00800 wt. %, calculated as solids content of boride in the total polymer composition. In a particular embodiment, which can contain further colouring agents, the borides are used in an amount of preferably from 0.00350 wt. % to 0.00850 wt. % and particularly preferably from 0.00400 wt. % to 0.00800 wt. %, calculated as solids content of boride in the total polymer mixture. In this connection, solids content of boride means the boride in the form of the pure substance and not a suspension or other preparation containing the pure substance.

c) at least one inorganic, nano-scale pigment, preferably carbon black, in particular nano-scale carbon black, The nano-scale carbon black is used in the composition according to the invention preferably in concentrations of from 0.00080 wt. % to 0.00350 wt. %, particularly preferably from 0.00090 wt. % to 0.00300 wt. % and most particularly preferably in concentrations of from 0.00100 wt. % to 0.00280 wt. %. In a particular embodiment, which can contain further colouring agents, the nano-scale carbon black is preferably used in an amount of from 0.00140 wt. % to 0.00260 wt. %, particularly preferably in an amount of from 0.00150 wt. % to 0.00250 wt. %.

d) optionally at least one colouring agent based on anthraquinone, perinone or phthaloperinone, or mixtures thereof, and e) optionally additives, such as stabilizers, antioxidants, demoulding agents, flameproofing agents, heat stabilizers, UV stabilizers, or optical brightening agents.

The invention further provides a process for the preparation of the compositions according to the invention and the use thereof and products produced therefrom.

DETAILED DESCRIPTION OF SOME EMBODIMENTS

Transparent thermoplastic plastics within the scope of the invention are, for example, polymers of ethylenically unsaturated monomers and/or polycondensation products of bifunctional reactive compounds. Examples of transparent thermoplastic polymers are, for example, polycarbonates or copolycarbonates based on diphenols, poly- or copoly-acrylates and poly- or copoly-methacrylate, such as, for example, poly- or copoly-methyl methacrylates (such as PMMA), as well as copolymers with styrene, such as, for example, transparent polystyrene acrylonitrile (PSAN), or polymers based on ethylene and/or propylene as well as aromatic polyesters such as polyethylene terephthalate (PET), polybutylene terephthalate (PBT), polyethylene naphthalate (PEN) or polyethylene terephthalate-cyclohexanedimethanol copolymer (PETG), transparent thermoplastic polyurethanes and polystyrenes. Polymers based on cyclic olefins (e.g. TOPAS®, a commercial product of Ticona) can also be mixed in.

Mixtures of a plurality of transparent thermoplastic polymers, in so far as they can be mixed with one another to give a transparent mixture, are also possible, preference being given to a mixture of polycarbonate with PMMA (more preferably with PMMA<2 wt. %) or polyester.

Particularly preferred polycarbonates are the homopolycarbonate based on bisphenol A, the homopolycarbonate based on 1,3-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane.

Polycarbonates within the scope of the present invention are both homopolycarbonates and copolycarbonates; the polycarbonates can, in known manner, be linear or branched.

The preparation of the polycarbonates is carried out in known manner from diphenols, carbonic acid derivatives, optionally chain terminators and branching agents.

Details of the preparation of polycarbonates have been laid down in many patent specifications for about 40 years. By way of example, reference is made here only to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, Volume 11, Second Edition, 1988, pages 648-718, and finally to Dres. U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299.

Diphenols suitable for the preparation of the polycarbonates are, for example, hydroquinone, resorcinol, dihydroxydiphenyls, bis-(hydroxyphenyl)-alkanes, bis(hydroxyphenyl)-cycloalkanes, bis-(hydroxyphenyl) sulfides, bis-(hydroxyphenyl) ethers, bis-(hydroxyphenyl) ketones, bis-(hydroxyphenyl)-sulfones, bis-(hydroxyphenyl) sulfoxides, alpha,alpha'-bis-(hydroxyphenyl)-diisopropylbenzenes, pththalimides derived from isatin or phenolphthalein derivatives, and compounds thereof alkylated and halogenated on the ring.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropyl-benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxy-phenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxy-phenyl)-3,3,5-trimethylcyclohexane.

These and further suitable diphenols are described, for example, in U.S. Pat. Nos. 3,028,635, 2,999,825, 3,148,172, 2,991,273, 3,271,367, 4,982,014 and U.S. Pat. No. 2,999, 846, in DE-A 1 570 703, DE-A 2 063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and in JP-A 62039/1986, JP-A 62040/1986 and JP-A 105550/1986.

In the case of homopolycarbonates, only one diphenol is used; in the case of copolycarbonates, a plurality of dip henols is used.

Suitable carbonic acid derivatives are, for example, phosgene or diphenyl carbonate.

Suitable chain terminators which can be used in the preparation of the polycarbonates are both monophenols and monocarboxylic acids. Suitable monophenols are phenol itself, alkylphenols such as cresols, p-tert-butylphenol, cumylphenol, p-n-octylphenol, p-isooctylphenol, p-n-nonylphenol and p-isononylphenol, halophenols such as p-chlorophenol, 2,4-dichlorophenol, p-bromophenol and 2,4,6-tribromophenol, 2,4,6-triiodophenol, p-iodophenol, and mixtures thereof.

Preferred chain terminators are phenol, cumylphenol and/or p-tert-butylphenol.

Suitable monocarboxylic acids are also benzoic acid, alkylbenzoic acids and halobenzoic acids.

Preferred chain terminators are also the phenols which are mono- or poly-substituted by C1- to C30-alkyl radicals, linear or branched, preferably unsubstituted or substituted by tert-butyl.

The amount of chain terminator to be used is preferably from 0.1 to 5 mol %, based on moles of diphenols used in a particular case. The addition of the chain terminators can take place before, during or after the phosgenation.

Suitable branching agents are the compounds known in polycarbonate chemistry having a functionality of three or more than three, in particular those having three or more than three phenolic OH groups.

Suitable branching agents are, for example, phloroglucinol, 4,6-dimethyl-2,4,6-tri-(4-hydroxyphenyl)-hept-2-ene, 4,6-dimethyl-2,4,6-tri(4-hydroxyphenyl)-heptane, 1,3,5-tri (4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methyl-benzyl)-4-methylphenol, 2-(4-hydroxyphenyl)-2-(2, 4-dihydroxyphenyl)-propane, hexa-(4(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4', 4"-dihydroxytriphenyl)-methyl)-benzene as well as 2,4-dihydroxybenzoic acid, trimesic acid, cyanuric chloride and 3,3-bis-(3-methyl-4-hydroxyphenyl)-2-oxo-2,3-dihydroindole.

The amount of branching agents optionally to be used is preferably from 0.05 mol % to 2.00 mol %, based in turn on moles of di phenols used in a particular case.

The branching agents can either be placed in the aqueous alkaline phase with the diphenols and the chain terminators or they can be dissolved in an organic solvent and added before the phosgenation. In the case of the transesterification process, the branching agents are used together with the diphenols.

The aromatic polycarbonates of the present invention have weight-average molecular weights Mw (determined by gel permeation chromatography and calibration with polycarbonate calibration) of from 5,000 to 200,000, preferably from 10,000 to 80,000 and particularly preferably from 15,000 to 40,000 (this corresponds approximately to from 12,000 to 330,000, preferably from 20,000 to 135,000 and particularly preferably from 28,000 to 69,000, determined by calibration by means of polycarbonate standard).

The polymer compositions according to the invention can optionally contain, in addition to the stabilizers according to the invention, also further conventional polymer additives, such as, for example, the antioxidants, demoulding agents, flameproofing agents, colouring agents, heat stabilizers, UV stabilizers or optical brightening agents described in EP-A 0 839 623, WO-A 96/15102, EP-A 0 500 496 or "Plastics Additives Handbook", Hans Zweifel, 5th Edition 2000, Hanser Verlag Munich, in the amounts conventional for the thermoplastics in question. In a specific embodiment of the invention, of the mentioned further conventional polymer additives that are optionally present, particular preference is given to colouring agents. The further polymer additives are preferably used in amounts of from 0 wt. % to 5 wt. %, more preferably from 0.1 wt. % to 1 wt. %, in each case based on the amount of the total polymer compositions. Mixtures of a plurality of additives are also possible.

The nano-scale boride-based inorganic IR absorber particles provided by the present application are preferably a metal boride, the metal being selected from the group comprising La, Ce, Pr, Nd, Tb, Dy, Ho, Y, Sm, Eu, ER, Tm, Yb, Lu, Sr, Ti, Zr, Hf, V, Ta, Cr, Mo, W and Ca. The hexaboride form is particularly preferred. Particular preference is given to lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride (CrB and $CrB_2$), molybdenum boride ($MoB_2$, $Mo_2B_5$ and MoB), tungsten boride ($W_2B_5$), or combinations of these borides. Most particular preference is given to borides based on lanthanum hexaboride ($LaB_6$) or mixtures containing lanthanum hexaboride.

The surface of these particles is preferably unoxidised; however, oxidised or partially oxidised particles can be used.

In a particular embodiment of the present invention, the use solely of lanthanum hexaboride ($LaB_6$) is most particularly preferred.

The boride-based IR absorbers can be prepared, for example, from oxides of the rare earths, such as, for example, $X_2O_3$ (where X e.g.=La, Ce, Pr, Nd, Gd) and, for example, boron carbides (B4C) by mixing those compounds and tempering the mixture for several hours, such as, for example, 3 hours, in vacuo at high temperatures, such as, for example 1500° C. The boride is obtained in the form of a powder. There is no limitation regarding the form of the finely divided particles—for example, the particles can have a spherical, platelet-like, irregular or needle-like form. The absorbing power for IR radiation is greater, the more crystalline the boride particles. However, even particles having low crystallinity (e.g. characterised by a broad diffraction peak in the X-ray diffraction experiment) have an adequate IR-absorbing property within the scope of the invention. However, that is only the case as long as the particles have on the inside a bond of the metal used and boron. The colour of the particles in the powder can be, for example, greyish-black, brownish-black, greenish-black or the like.

The average size of the particles (determined by TEM/transmission electron microscopy) is preferably smaller than 200 nm, particularly preferably smaller than or equal to 150 nm and most particularly preferably smaller than 100 nm, the particle diameters preferably being greater than 5 nm, more preferably greater than 10 nm and particularly preferably greater than 15 nm.

There are no limitations regarding the size distribution of the particles, so bi- or higher-modal distributions can also be present. The particles are transparent in the visible range of the spectrum, transparent meaning that the absorption of the IR absorbers in the visible range is low compared with the absorption in the IR range and the IR absorber does not lead to markedly increased haze of the composition or the end product in question. This means that, in the composition as a whole, the transparent moulded body has a transmission of at least 6% and a haze of less than 3%, preferably less than 2.5%, more preferably less than 2.0%. The Tds value is preferably less than 70%, particularly preferably less than 60% and most particularly preferably less than 50%. In a particular embodiment, the Tds value is less than 20%, particularly preferably less than 15% ($T_{ds}$: direct solar transmittance; values are measured on optical colour sample sheets having a thickness of 4 mm. Calculation of the total transmission $T_{ds}$ is carried out in accordance with ISO 13837, computational convention "A").

The size of the particles can be determined by means of transmission electron microscopy (TEM). Such measurements on IR absorber nanoparticles are described, for example, in Adachi et al., J. Am. Ceram. Soc. 2008, 91, 2897-2902.

The surface of the particles can be treated. For example, the surface can be treated with a silane or provided with a titanium-based or zirconium-based layer or similar layers. The resistance to moisture can be increased by means of this treatment. This type of coating increases the long-term stability in respect of the IR absorption and is described, for example, in US 2005 0161642.

In addition to the boride-based particles, further particles based on $SiO_2$, $TiO_2$, $ZrO_2$, $Al_2O_3$ or MgO can—but do not necessarily have to be—present. These particles are preferably present in a size of less than 200 nm.

In the present invention, the finely divided IR absorber particles are introduced into the polymer matrix in the form of a dispersion. This dispersion prevents reagglomeration and facilitates incorporation into a thermoplastic matrix such as, for example, polycarbonate. Polymer-like dispersing agents are preferably used. Suitable polymer-based dispersing agents are especially dispersing agents which have high light transmission, such as, for example, polyacrylates, polyurethanes, polyethers, polyesters or polyurethanes and polymers derived therefrom. Preferred as dispersing agents are polyacrylates, polyethers and polyester-based polymers. Dispersing agents having high temperature stability are preferably used.

The blend ratio of polymeric dispersing agent to boride particles is usually from 0.2 wt. % to 50.0 wt. %, preferably from 0.5 wt. % to 50.0 wt. % and most particularly preferably from 1.0 wt. % to 40.0 wt. %, based on the amount by weight of inorganic IR absorber. In order to prepare the inorganic IR absorber nanoparticles according to the invention, the IR absorber can be mixed with the dispersing agents described hereinbelow and further organic solvents, such as, for example, toluene, benzene or similar aromatic hydrocarbons, and ground in suitable mills, such as, for example, ball mills, with the addition of zirconium oxide (e.g. having a diameter of 0.3 mm) in order to prepare the desired particle size distribution. The nanoparticles are obtained in the form of a dispersion. After grinding, further dispersing agents can optionally be added. The solvent is removed at elevated temperatures and reduced pressure.

The preparation of lanthanum hexaboride and of the lanthanum hexaboride dispersion is described, for example, in JP2003-277045, DE 10392543 and in Adachi et al., J. Am. Chem. Ceram. Soc. 2008, 91[9], 2897-2902. Lanthanum hexaboride in the form of the dispersion, which is suitable within the scope of the invention, is obtainable commercially from, for example, Sumitomo Metal Mining Co., Ltd., for example under the trade name KHDS 06.

Dispersing agents suitable for the present invention are obtainable commercially. Polyacrylate-based dispersing agents are particularly suitable. Polyacrylates are obtainable, for example, from Ciba Specialty Chemicals under the trade names EFKA®, for example EFKA® 4500 and EFKA® 4530. Polyester-based dispersing agents are likewise suitable. Polyester-containing dispersing agents are obtainable from Avecia under the trade names Solsperse®, for example Solsperse® 22000, 24000SC, 26000, 27000. Polyurethane-based systems are also suitable. These are obtainable from Ciba Specialty Chemicals under the trade names EFKA® 4046, EFKA® 4047. Texaphor® P60 and P63 are corresponding trade names of Cognis. Polyether-containing dispersing agents can likewise be used. These are known, for example, under the trade names Disparlon® DA234 and DA325 of Kusumoto Chemicals.

The dispersing agents can be used on their own or in combinations. With regard to the thermal stability, dispersing agents from the group of the polyacrylates and polyesters are particularly preferred.

The IR-absorbing inorganic boride is preferably used in the polymer composition according to the invention in dispersion in an organic matrix and preferably in the concentrations described below. Preferably, the borides are used in an amount of from 0.00150 wt. % to 0.01500 wt. %, preferably from 0.00200 wt. % to 0.01100 wt. % and particularly preferably from 0.00270 wt. % to 0.00800 wt. %, calculated as solids content of boride in the total polymer composition. In a particular embodiment, which can contain further colouring agents, the borides are used in an amount of preferably from 0.00350 wt. % to 0.00850 wt. % and particularly preferably from 0.00400 wt. % to 0.00800 wt. %, calculated as solids content of boride in the total polymer composition. In this connection, solids content of boride means the boride in the form of the pure substance and not a suspension or other preparation containing the pure substance.

In a preferred embodiment, the lanthanum hexaboride is in the form of a ready-to-use dispersion of a mixture of polymethyl methacrylate and polyester in a solids content of from 5 wt. % to 25 wt. %. Organic solvents such as toluene and further inorganic particles such as zirconium dioxide can additionally be present.

In a further embodiment it is possible additionally to use further IR absorbers as IR absorbers in addition to the borides according to the invention, the amount of such further IR absorbers as regards amount and/or performance in such a mixture in each case being below the amount of the above-described borides. In the case of mixtures, preference is given to compositions that contain from two up to and including five and particularly preferably two or three different IR absorbers. In a particular embodiment of the present invention, the polymer composition according to the invention does not contain any inorganic IR absorbers of the tungstate type, such as, for example, caesium tungstate, $Cs_{0.33}WO_3$.

The further IR absorber is preferably selected from the group of the tin oxides, particularly preferably antimony-doped tin oxide or indium tin oxide.

Compounds such as indium oxide doped with from 2 to 30 atom %, preferably from 4 to 12 atom %, tin (ITO) or with from 10 to 70 atom % fluorine can further be added.

Particular preference is given to the combination with tin oxide as a further IR absorber, which tin oxide is doped with from 2 to 60 atom % antimony (ATO) or with from 10 to 70 atom % fluorine.

Zinc oxide doped with from 1 to 30 atom %, preferably from 2 to 10 atom %, aluminium or with from 2 to 30 atom % indium or with from 2 to 30 atom % gallium is further preferred.

Mixtures of the above-mentioned infrared absorbers are particularly suitable because the person skilled in the art, by means of a suitable choice, can optimise the absorption in the near-infrared range.

In a further preferred embodiment, the additional IR absorber(s) has(have) an absorption spectrum different from that of the boride used based on the absorption maxima, so that a maximum absorption range is covered by the maxima.

Suitable additional organic infrared absorbers are described by substance classes in, for example, M. Matsuoka, Infrared Absorbing Dyes, Plenum Press, New York, 1990. Particularly suitable are infrared absorbers from the classes of the phthalocyanines, the naphthalocyanines, the metal complexes, the azo dyes, the anthraquinones, the quadratic acid derivatives, the immonium dyes, the perylenes, the quaterylenes and the polymethines. Of those, phthalocyanines and naphthalocyanines are most particularly suitable.

On account of their improved solubility in thermoplastics, phthalocyanines and naphthalocyanines having sterically demanding side groups are to be preferred, such as, for example, phenyl, phenoxy, alkylphenyl, alkylphenoxy, tert-butyl, (-S-phenyl), —NH-aryl, —NH-alkyl and similar groups.

The polymer composition contains at least one inorganic pigment, preferably carbon black. The carbon black is preferably present in finely dispersed form in the organic polymer matrix and is preferably nano-scale. Suitable carbon blacks have an average particle size of preferably less than 100 nanometres (nm), more preferably less than 75 nm, yet more preferably less than 50 nm and particularly preferably less than 40 nm, the average particle size preferably being greater than 0.5 nm, more preferably greater than 1 nm and particularly preferably greater than 5 nm.

Carbon blacks suitable within the scope of the invention differ from so-called conductive blacks in that they have only low or no electrical conductivity. Compared with the carbon blacks used here, conductive blacks have specific morphologies and superlattices in order to achieve high conductivity. By contrast, the nano-scale carbon blacks used here can very readily be dispersed in thermoplastics so that virtually no cohesive regions of carbon black occur, from which a corresponding conductivity might result. Suitable carbon blacks within the scope of the invention which are obtainable commercially are obtainable under a large number of trade names and in a large number of forms, such as pellets or powder. For example, suitable carbon blacks are obtainable under the trade names BLACK PEARLS®, in the form of wet-processed pellets under the names ELFTEX®, REGAL® and CSX®, and in a flocculent form under the names MONARCH®, ELFTEX®, REGAL® and MOGUL®—all obtainable from Cabot Corporation.

In a particularly preferred embodiment, the carbon black types have particle sizes of from 10 to 30 nm and have a surface area of preferably from 35 to 138 m² per g (m²/g). The carbon black can be treated or untreated—for example, the carbon black can be treated with specific gases, with silica or organic substances, such as, for example, butyl-lithium. Such treatment allows the surface to be modified or functionalised. This can promote compatibility with the correspondingly used matrix. Particular preference is given to carbon blacks marketed under the trade name BLACK PEARLS® (CAS No. 1333-86-4).

The nano-scale carbon black is used in the composition according to the invention preferably in concentrations of from 0.00080 wt. % to 0.00350 wt. %, particularly preferably from 0.00090 wt. % to 0.00300 wt. % and most particularly preferably in concentrations of from 0.00100 wt. % to 0.00280 wt. %. In a particular embodiment, which can contain further colouring agents, the nano-scale carbon black is preferably used in an amount of from 0.00140 wt. % to 0.00260 wt. %, particularly preferably in an amount of from 0.00150 wt. % to 0.00250 wt. %.

In a preferred embodiment, the ratio of IR absorber to carbon black is from 20:1 to 0.4:1, preferably from 15:1 to 1:1. In a specific embodiment of the present invention, the ratio of IR absorber to carbon black is from 5:1 to 1.5:1.

The concentrations indicated herein for carbon blacks and IR absorbers are preferably used for finished parts having thicknesses of from 2 mm to 8 mm, preferably from 3.5 to 7.0 mm and particularly preferably from 4 mm to 6 mm. In the case of a smaller or larger thickness, the concentrations must be increased or reduced accordingly in order to avoid, for example, too great a haze or too low an effect.

In a particular embodiment in which, for example, high torsional stiffness is required—for example in the case of aircraft/railway vehicles—thicknesses of from 8 to 20 mm can be required. The concentrations of the IR absorbers and of the inorganic nano-scale pigment must be adapted accordingly in this case, that is to say the concentration falls as the layer thickness increases.

In a particular embodiment, the polymer composition contains heat stabilizers. Particularly suitable are phosphites and phosphonites as well as phosphines. Examples are triphenyl phosphite, diphenylalkyl phosphite, phenyldialkyl phosphite, tris(nonylphenyl) phosphite, trilauryl phosphite, trioctadecyl phosphite, distearylpentaerythritol diphosphite, tris(2,4-di-tert-butylphenyl) phosphite, diisodecylpentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocine, 2,2',2"-nitrilo-[triethyltris(3,3',5,5'-tetra-tert-butyl-1,1'-biphenyl-2,2'-diyl) phosphite], 2-ethylhexyl (3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, triphenylphosphine (TPP), trialkylphenylphosphine, bisdiphenylphosphino-ethane or a trinaphthylphosphine. Particular preference is given to the use of triphenylphosphine (TPP), Irgafos® 168 (tris(2,4-di-tert-butyl-phenyl) phosphite) and tris-(nonylphenyl) phosphite or mixtures thereof.

Phenolic antioxidants such as alkylated monophenols, alkylated thioalkylphenols, hydroquinones and alkylated hydroquinones can also be used. Irganox® 1010 (pentaerythritol 3-(4-hydroxy-3,5-di-tert-butylphenyl)propionate; CAS: 6683-19-8) and Irganox® 1076 (2,6-di-tert-butyl-4-(octadecanoxycarbonylethyl)phenol) are preferably used. In a specific embodiment of the present invention, the phosphine compounds according to the invention are used together with a phosphite or a phenolic antioxidant or a mixture of the two last-mentioned compounds.

In a preferred embodiment, the polymer composition according to the invention further contains an ultraviolet absorber. Ultraviolet absorbers suitable for use in the polymer composition according to the invention are compounds that have as low a transmission as possible below 400 nm and as high a transmission as possible above 400 nm. Such compounds and their preparation are known in the literature and are described, for example, in EP-A 0 839 623, WO-A 96/15102 and EP-A 0 500 496. Particularly suitable ultraviolet absorbers for use in the composition according to the invention are benzotriazoles, triazines, benzophenones and/or arylated cyanoacrylates.

Particularly suitable ultraviolet absorbers are hydroxybenzotriazoles, such as 2-(3',5'-bis-(1,1-dimethylbenzyl)-2'-hydroxy-phenyl)-benzotriazole (Tinuvin® 234, Ciba Spezialitätenchemie, Basel), 2-(2'-hydroxy-5'-(tert-octyl)-phenyl)-benzotriazole (Tinuvin® 329, Ciba Spezialitätenchemie, Basel), 2-(2'-hydroxy-3'-(2-butyl)-5'-(tert-butyl)-phenyl)-benzotriazole (Tinuvin® 350, Ciba Spezialitätenchemie, Basel), bis-(3-(2H-benztriazolyl)-2-hydroxy-5-tert-octyl)methane (Tinuvin® 360, Ciba Spezialitätenchemie, Basel), (2-(4,6-diphenyl-1,3,5-triazin-2-yl)-5-(hexyloxy)-phenol (Tinuvin® 1577, Ciba Spezialitätenchemie, Basel), as well as the benzophenones 2,4-dihydroxy-benzophenone (Chimasorb® 22, Ciba Spezialitätenchemie, Basel) and 2-hydroxy-4-(octyloxy)-benzophenone (Chimassorb® 81, Ciba, Basel), 2-propenoic acid, 2-cyano-3,3-diphenyl-2,2-bis [[(2-cyano-l-oxo-3,3-diphenyl-2-propenyl)oxy]-methyl]-1,3-propane-diyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitätenchemie, Basel) or tetra-ethyl-2,2'-(1,4-phenylenedimethylidene)-bismalonate (Hostavin® B-Cap, Clariant AG).

Mixtures of these ultraviolet absorbers can also be used.

There are no particular limitations regarding the amount of ultraviolet absorber contained in the composition, as long as the desired absorption of UV radiation and adequate transparency of the moulded body produced from the composition are ensured. According to a specific embodiment of the invention, the composition contains ultraviolet absorber in an amount of from 0.05 wt. % to 20.00 wt. %, in particular from 0.07 wt. % to 10.00 wt. % and most particularly preferably from 0.10 wt. % to 1.00 wt. %.

As well as containing the inorganic IR absorber and the inorganic nano-scale pigment, the compositions according to the invention preferably contain further colouring agents for adjusting the colour. The colourants serve to adjust the colour in transmission—they affect the reflected colour to only a minor extent. They are preferably colouring agents based on anthraquinone, on perinone or on phthaloperinone.

There is preferably used at least one colouring agent of the following structures (1)-(2):

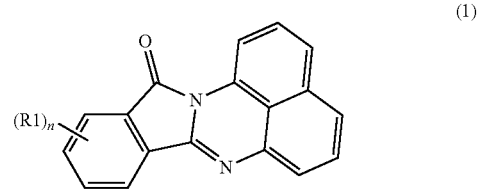

(1)

In that formula, RI can be a linear or branched alkyl radical or halogen, preferably a halogen. n is a natural number from 0 to 4.

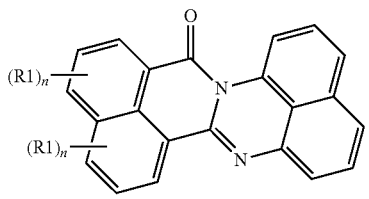

(2)

wherein the substituents R1, independently of one another, can be the radicals described above and n for each designated aromatic ring represents a natural number from 0 to 3.

The colourants of formulae (1) and (2) are preferably used in amounts of from 0.00010 wt. % to 0.05000 wt. %, particularly preferably from 0.00100 wt. % to 0.01000 wt. %, in each case based on the total moulding composition.

As further additional colourants or pigments there can be used, for example, organic or inorganic pigments or organic colourants or the like. There can be used as inorganic pigments, for example, sulfur-containing pigments such as cadmium red and cadmium yellow, pigments based on iron cyanide such as Prussian blue, oxide pigments such as titanium dioxide, zinc oxide, red iron oxide, black iron oxide, chromium oxide, titanium yellow, zinc iron brown, titanium cobalt green, cobalt blue, copper chromium black and copper iron black or chromium-based pigments such as chromium yellow. Preferred organic pigments or colourants are, for example, colourants derived from phthalocyanine, such as copper phthalocyanine blue and copper phthalocyanine green, condensed polycyclic colourants and pigments, such as azo-based (e.g. nickel azo yellow), sulfur indigo colourants, perynon-based, perylene-based, quinacridone-derived, dioxazine-based, isoindolinone-based and quinophthalone-derived derivatives, anthraquinone-based, heterocyclic systems, etc. Of these, cyanine derivatives, quinoline derivatives, anthraquinone derivatives, phthalocyanine derivatives are preferred. Concrete examples of commercial products would be, for example, MACROLEX Blue RR®, MACROLEX Violet 3R®, MACROLEX Violet B® (Lanxess AG, Germany), Sumiplast Violet RR, Sumiplast Violet B, Sumiplast Blue OR (Sumitomo Chemical Co., Ltd.), Diaresin Violet D, Diaresin Blue G, Diaresin Blue N (Mitsubishi Chemical Corporation), Heliogen Blue or Heliogen Green (BASF AG, Germany).

These colourants can be used in amounts of from 0.00001 wt. % to 1.00000 wt. %, preferably from 0.00010 wt. % to 0.10000 wt. % and particularly preferably from 0.00050 wt. % to 0.05000 wt. %.

Particularly suitable demoulding agents for the composition according to the invention are, for example, pentaerythritol tetrastearate (PETS) or glycerol monostearate (GMS). Methods for producing the polymer compositions according to the invention are known to the person skilled in the art.

The preparation of the polymer compositions according to the invention containing a thermoplastic plastic, an inorganic IR absorber from the group of the borides, optionally one or more colouring agents and optionally further conventional polymer additives is carried out by conventional incorporation processes by combining, mixing and homogenising the individual constituents, the homogenisation in particular preferably being carried out in the melt under the action of shear forces. Combining and mixing prior to melt homogenisation are optionally carried out using powder premixtures.

It is also possible to use premixtures which have been prepared from solutions of the mixture components in suitable solvents, homogenisation in solution optionally being carried out and the solvent subsequently being removed.

In particular, the IR absorbers, colouring agents, ultraviolet absorbers and other additives of the composition according to the invention can be introduced by known processes or in the form of a masterbatch.

The use of masterbatches is particularly preferred for the introduction of the IR absorber, there being used in particular masterbatches based on polycarbonate into which the IR absorbers have been introduced in the form of a ready-to-use IR absorber formulation containing dispersing agents, preferably polyacrylate-, polyether- or polyester-based dispersing agents, preferably dispersing agents having high temperature stability, such as a polyacrylate (homo- or co-polymer), such as, for example, polymethyl methacrylate, and/or polyesters or mixtures thereof, further containing auxiliary substances such as, for example, zirconium dioxide and optionally residual solvents such as, for example, toluene, benzene or similar aromatic hydrocarbons. By using such masterbatches in combination with the corresponding IR absorber formulations, agglomeration of the IR absorber in the polymer composition is effectively prevented.

In this connection, the composition can be combined, mixed, homogenised and then extruded in conventional devices such as screw-type extruders (for example twin-screw extruder, ZSK), kneaders, Brabender or Banbury mills. After the extrusion, the extrudate can be cooled and comminuted. It is also possible for individual components to be premixed and the remaining starting materials subsequently to be added separately and/or likewise as a mixture.

In a particular embodiment, the IR absorber according to the invention, before it is incorporated into the thermoplastic polymer matrix, is optionally mixed with the nano-scale pigment according to the invention and optionally further additives to form a masterbatch, mixing preferably taking place in the melt under the action of shear forces (for example in a kneader or twin-screw extruder). This process offers the advantage that the IR absorber can better be distributed in the polymer matrix. In order to prepare the masterbatch, the thermoplastic plastic that also constitutes the main component of the ultimate total polymer composition is preferably chosen as the polymer matrix.

The masterbatch so prepared contains
a. from 85.00 wt. % to 98.90 wt. %, preferably from 93.00 wt. % to 98.90 wt. %, of a transparent thermoplastic plastic;
b. from 0.10 wt. % to 2.00 wt. % boride as inorganic IR absorber, preferably lanthanum hexaboride $LaB_6$; and
c. from 1.00 wt. % to 4.80 wt. % dispersing agent;
d. optionally from 0.00 wt. % to 0.20 wt. %, preferably from 0.01 wt. % to 0.10 wt. %, of at least one stabilizer selected from the group comprising phosphines, phosphites and phenolic antioxidants and mixtures of these stabilizers;
e. optionally from 0.001 wt. % to 0.200 wt. % inorganic nano-scale pigment, preferably carbon black;
f. optionally from 0.00 wt. % to 8.00 wt. % of at least one further auxiliary substance and/or additive, such as, for example, zirconium dioxide;
g. optionally colouring agents,
wherein the sum of components a-g is 100 wt. %.

In a preferred embodiment, the inorganic IR absorber is present in an acrylate matrix. In a further preferred embodiment, the transparent thermoplastic plastic is a polycarbonate.

The polymer compositions according to the invention can be processed to products or moulded bodies by, for example, first extruding the polymer compositions as described to form a granulate and processing the granulate by suitable processes into various products or moulded bodies in known manner.

In this connection, the compositions according to the invention can be converted, for example, by means of hot pressing, spinning, blow moulding, deep drawing, extrusion or injection moulding into products or moulded bodies, moulded objects such as parts for toys, fibres, foils, tapes, sheets such as solid sheets, multiwall sheets, twin-wall sheets or corrugated sheets, containers, pipes or other profiles. The use of multilayer systems is also of interest. Application can take place at the same time as or immediately after moulding of the base body, for example by coextrusion or multicomponent injection moulding. However, application can also be to the finished moulded base body, for example by lamination with a film or by coating with a solution.

Sheets of a base layer and optional top layer/layers are preferably produced by (co)extrusion, however.

For extrusion, the polymer composition, which has optionally been pretreated, for example by means of drying, is fed to the extruder and melted in the plastification system of the extruder. The plastics melt is then pressed through a flat die or multiwall sheet die and thereby shaped, is brought to the desired final form in the roll gap of a smoothing calender, and its shape is fixed by alternate cooling on smoothing rollers and with ambient air. The temperatures necessary for extrusion of the polymer composition are set, it usually being possible to follow the manufacturer's instructions. If the polymer compositions contain, for example, polycarbonates having a high melt viscosity, they are normally processed at melt temperatures of from 260° C. to 350° C., and the cylinder temperatures of the plastification cylinder and the die temperatures are set accordingly.

By using one or more side extruders and a multiple manifold die or optionally suitable melt adapters upstream of a flat die it is possible to lay thermoplastic melts of different compositions above one another and accordingly produce multilayer sheets or foils (for coextrusion see, for example, EP-A 0 110 221, EP-A 0 110 238 and EP-A 0 716 919, for details of the adapter and die process see Johannaber/Ast: "Kunststoff-Maschinenführer", Hanser Verlag, 2000 and Gesellschaft Kunststofftechnik: "Coextrudierte Folien und Platten: Zukunftsperspektiven, Anforderungen, Anlagen und Herstellung, Qualitätssicherung", VDI-Verlag, 1990).

Preferred products or moulded bodies according to the invention are sheets, foils, glazing, for example car windows, windows of railway vehicles and aircraft, car sun-roofs, roof coverings or glazing for buildings, which contain the compositions according to the invention. In addition to solid sheets, it is also possible to use twin-wall sheets or multiwall sheets. In addition to the compositions according to the invention, further material components, for example, can be present in the products according to the invention as further components of the products according to the invention. For example, glazing can have sealing materials at the edges of the panels. Roof coverings can have, for example, metal components such as screws, metal pins or the like, which can be used to secure or guide (in the case of folding or sliding roofs) the roofing elements. Further materials can also be joined to the compositions according to the invention, for example by 2-component injection moulding. For example, the corresponding structural element having IR-absorbing properties can be provided with an edge which is used, for example, for adhesive bonding.

In a particular embodiment, the articles produced from the composition of the present invention are coated. This coating serves to protect the thermoplastic material against general weathering influences (e.g. damage by sunlight) as well as against mechanical damage to the surface (e.g. scratching) and accordingly increases the resistance of the correspondingly equipped articles.

It is known that polycarbonate can be protected against UV radiation by means of various coatings. Such coatings conventionally contain UV absorbers. Such layers likewise increase the scratch resistance of the corresponding article. The articles of the present invention can carry single-layer or multilayer systems. They can be coated on one side or on both sides. In a preferred embodiment, the article contains a scratch-resistant lacquer containing UV absorber. In a particular embodiment, the multilayer product contains at least one layer containing the composition according to the invention, at least one anti-UV layer and optionally a scratch-resistant coating.

In the case of glazing materials, the article carries at least one scratch-resistant or anti-reflection coating on at least one side.

The preparation of the coating, for example an anti-reflection coating, can be carried out by various methods. For example, coating can be carried out by various methods of vapour deposition, for example by electron beam processes, resistance heating and by plasma deposition or various sputtering methods such as high-frequency sputtering, magnetron sputtering, ion beam sputtering, etc., ion plating by means of DC, RF, HCD methods, reactive ion plating, etc. or chemical gas-phase deposition. An anti-reflection coating can also be applied from solution. Accordingly, a corresponding coating solution can be prepared via a dispersion of a metal oxide having a high refractive index, such as $ZrO_2$, $TiO_2$, $Sb_2O_5$ or $WO_3$, in a silicon-based lacquer, which coating solution is suitable for the coating of plastics articles and can be cured thermally or with UV assistance.

Various methods are known for producing a scratch-resistant coating on plastics articles. For example, lacquers based on epoxy, acrylic, polysiloxane, colloidal silica gel or inorganic/organic materials (hybrid systems) can be used. Such systems can be applied, for example, by dipping processes, spin coating, spraying processes or flow coating. Curing can be carried out thermally or by means of UV radiation. Single- or multi-layer systems can be used. The scratch-resistant coating can be applied directly or after preparation of the substrate surface with a primer. Furthermore, a scratch-resistant coating can be applied by plasma-assisted polymerisation processes, for example via an $SiO_2$ plasma. Anti-fog or anti-reflection coatings can likewise be produced by plasma processes. It is further possible to apply a scratch-resistant coating to the resulting moulded body by means of specific injection-moulding processes, such as, for example, the back-injection of surface-treated foils. Various additives, such as, for example, UV absorbers derived, for example, from triazoles or triazines, can be present in the scratch-resistant coating. IR absorbers of organic or inorganic nature can also be present. Such additives can be contained in the scratch-resistant lacquer itself or in the primer layer. The thickness of the scratch-resistant layer is from 1 to 20 μm, preferably from 2 to 15 μm. Below 1 μm, the resistance of the scratch-resistant layer is unsatisfactory. Above 20 μm, cracks occur more frequently in the lacquer. The base material according to the invention, which is described in the present invention, is preferably provided with an above-described scratch-resistant and/or anti-reflection layer after the injection-moulded article has been produced, because the preferred field of use is in the window or automotive glazing sector.

For polycarbonates, a primer containing UV absorber is preferably used in order to improve the adhesion of the scratch-resistant lacquer. The primer can contain further stabilizers such as, for example, HALS systems (stabilizers based on sterically hindered amines), adhesion promoters, flow improvers. The resin in question can be selected from a large number of materials and is described, for example, in Ullmann's Encyclopedia of Industrial Chemistry, 5th Edition, Vol. A18, pp. 368-426, VCH, Weinheim 1991. Polyacrylates, polyurethanes, phenol-based, melamine-based, epoxy and alkyd systems, or mixtures of these systems, can be used. The resin is in most cases dissolved in suitable solvents—frequently in alcohols. Depending on the chosen resin, curing can take place at room temperature or at elevated temperatures. Temperatures of from 50° C. to 130° C. are preferably used—frequently after a large proportion of the solvent has briefly been removed at room temperature. Commercially obtainable systems are, for example, SHP470, SHP470FT2050 and SHP401 from Momentive Performance Materials. Such coatings are described, for example, in U.S. Pat. Nos. 6,350,512 B1, 5,869,185, EP 1308084, WO 2006/108520.

Scratch-resistant lacquers (hard-coat) are preferably composed of siloxanes and preferably contain UV absorbers. They are preferably applied by dipping or flow processes. Curing takes place at temperatures of from 50° C. to 130° C. Commercially obtainable systems are, for example, AS4000, SHC5020 and AS4700 from Momentive Performance Materials. Such systems are described, for example, in U.S. Pat. No. 5,041,313, DE 3121385, U.S. Pat. No. 5,391,795, WO 2008/109072. The synthesis of these materials is in most cases carried out by condensation of alkoxy- and/or alkyl-alkoxy-silanes with acid or base catalysis. Nanoparticles can optionally be incorporated. Preferred solvents are alcohols such as butanol, isopropanol, methanol, ethanol and mixtures thereof.

Instead of primer/scratch-resistant coating combinations, one-component hybrid systems can be used. These are described, for example, in EP0570165 or WO 2008/071363 or DE 2804283. Commercially obtainable hybrid systems are obtainable, for example, under the names PHC587 or UVHC 3000 from Momentive Performance Materials.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

The invention is described in greater detail hereinbelow by means of exemplary embodiments, the determination methods described herein being used for all corresponding parameters in the present invention unless indicated otherwise.

The melt volume rate (MVR) is determined in accordance with ISO 1133 (at 300° C.; 1.2 kg).

Measurement of the scattering effect:

Measurement of the colour takes place in reflection and is carried out as follows:

The test specimen is illuminated at an angle of incidence of 60° relative to the vertical using a white point light source, and the scattering is measured at an emergent angle of from 30° to −80° relative to the vertical, and the CIELAB colour coordinates L*, a*, b* are calculated in accordance with ASTM E 308 using illuminant D65 and a 10° observer (see FIG. 1). This colour system is described, for example, in Manfred Richter: Einführung in die Farbmetrik. 1984 ISBN 3-11-008209-8. For the evaluation of the colour, the b* value with a 10° observer is used (referred to hereinbelow as b* (60°)).

The measurements were carried out using a "Gon360-105" goniophotometer (Gon360 with multichannel spectrometer CAS 140) from Instrument Systems.

Hemispherical reflection (b* hemispherical)

The hemispherical reflection of the test specimen is measured in accordance with ASTM E 1331 and the CIELAB colour coordinates L*, a*, b* are calculated in accordance with ASTM E 308 using illuminant D65 and a 10° observer. The corresponding b*(hemispherical) value is given in the table.

Δb*: absolute value of the difference between b* (60°) and b* (hemispherical).

Determination of the $T_{DS}$ value (direct solar transmittance):

The transmission and reflection measurements were carried out using a Perkin Elmer Lambda 900 spectral photometer with a photometer sphere (i.e. determination of total transmission by measuring both the diffuse and direct transmission and the diffuse and direct reflection). All the values were determined from 320 nm to 2300 nm.

The total transmission $T_{im}$ was calculated in accordance with ISO 13837, computational convention "A".

Visual light transmission/haze:

The transmission measurements were carried out using a Perkin Elmer Lambda 900 spectral photometer with a photometer sphere (i.e. determination of the total transmission by measuring both the diffuse and direct transmission and the diffuse and direct reflection) in accordance with ASTM D1003.

Materials:

For the production of the test specimens, additive-free polycarbonate Makrolon 3108 from Bayer MaterialScience (linear bisphenol A polycarbonate) having a melt volume index (MVR) of 6 cm³/10 min at 300° C. and under a 1.2 kg load according to ISO 1033 is used.

For the production of the test specimens, polycarbonate Makrolon AL2647 from Bayer MaterialScience (linear polycarbonate based on bisphenol A) having an MVR of 12.5 cm³/10 min at 300° C. and under a 1.2 kg load according to ISO 1033 is used. This polycarbonate contains UV absorber, demoulding agent and heat stabilizer.

Lanthanum hexaboride $LaB_6$ (KHDS 06 from Sumitomo Metal Mining, Japan) is used as the IR absorber. The product is in the form of a dispersion. The weights indicated in the examples relate to lanthanum hexaboride as pure substance, the solids content of lanthanum hexaboride in the commercial KHDS06 dispersion used being 21.5 wt. %.

Black Pearls® 800 from Cabot Corp. are used as the nano-scale carbon black (particle size about 17 nm).

Makrolex Red EG from Lanxess Deutschland GmbH is employed as the colouring agent of formula (1) or (2), where used.

Anthraquinone-based Macrolex Blue RR from Lanxess Deutschland GmbH is used as a further colouring agent. A further colouring agent used is Heliogen Blue K 6911D from BASF SE, 67065 Ludwigshafen, Germany.

Compounding:

Compounding of the additives was carried out in a type ZE25 twin-screw extruder from KrausMaffei Berstorff at a case temperature of 260° C., or a melt temperature of 270° C., and a speed of 100 rpm, with the amounts of additives indicated in Table 1.

Test specimens:

The granulate is dried for 3 hours in vacuo at 120° C. and then processed on an Arburg 370 injection-moulding machine having a 25-injection unit at a melt temperature of 300° C. and a tool temperature of 90° C. to form colour sample sheets measuring 60 mm×40 mm×4 mm.

Example 1 (Comparison Example)

Makrolon® 3108 is compounded as described above without further additives. The results of the reflection measurement are given in Table 1.

Example 2 (Comparison Example)

Makrolon® 3108 is compounded as described above with 0.00086 wt. % lanthanum hexaboride, $LaB_6$ (which corresponds to 0.004 wt. % KHDS 06 dispersion). The results of the reflection measurement are given in Table 1.

Example 3 (Comparison Example)

Makrolon® 3108 is compounded as described above with 0.00108 wt. % lanthanum hexaboride, $LaB_6$ (which corresponds to 0.005 wt. % KHDS 06 dispersion). The results of the reflection measurement are given in Table 1.

Example 4 (Comparison Example)

Makrolon 3108 is compounded as described above with 0.00215 wt. % lanthanum hexaboride, $LaB_6$ (which corresponds to 0.01 wt. % KHDS 06 dispersion). The results of the reflection measurement are given in Table 1.

Example 5 (Comparison Example)

Makrolon® 3108 is compounded as described above with 0.00430 wt. % lanthanum hexaboride, $LaB_6$ (which corresponds to 0.02 wt. % KHDS 06 dispersion). The results of the reflection measurement are given in Table 1.

Example 6 (Comparison Example)

Makrolon® 3108 is compounded as described above with 0.01075 wt. % lanthanum hexaboride, $LaB_6$ (which corresponds to 0.05 wt. % KHDS 06 dispersion). The results of the reflection measurement are given in Table 1.

Example 7 (Comparison Example)

Makrolon® 3108 is compounded as described above with 0.02150 wt. % lanthanum hexaboride, $LaB_6$ (which corresponds to 0.1 wt. % KHDS 06 dispersion). The results of the reflection measurement are given in Table 1.

Example 8 (Comparison Example)

Makrolon® 3108 is compounded as described above with 0.00430 wt. % lanthanum hexaboride, $LaB_6$ (which corresponds to 0.02 wt. % KHDS 06 dispersion) and 0.0003 wt. % nano-scale carbon black. The results of the reflection measurement are given in Table 1.

Example 9 (Comparison Example)

Makrolon® 3108 is compounded as described above with 0.00430 wt. % lanthanum hexaboride, $LaB_6$ (which corresponds to 0.02 wt. % KHDS 06 dispersion) and 0.004 wt. % nano-scale carbon black. The results of the reflection measurement are given in Table 1.

Example 10 (According to the Invention)

Makrolon® 3108 is compounded as described above with 0.00430 wt. % lanthanum hexaboride, $LaB_6$ (which corresponds to 0.02 wt. % KHDS 06 dispersion) and 0.0025 wt. % nano-scale carbon black. The results of the reflection measurement are given in Table 1.

Example 11 (Comparison Example)

Makrolon® AL2647 is compounded as described above with 0.00667 wt. % lanthanum hexaboride, $LaB_6$ (which corresponds to 0.031 wt. % KHDS 06 dispersion) and 0.0005 wt. % nano-scale carbon black and, as colouring agent, 0.0055 wt. % Macrolex Red EG, 0.0039 wt. % Macrolex Blue RR and 0.0013 wt. % Heliogen Blue K6911D. The results of the reflection measurement are given in Table 2.

Example 12 (According to the Invention)

Makrolon® AL2647 is compounded as described above with 0.00667 wt. % lanthanum hexaboride, $LaB_6$ (which corresponds to 0.031 wt. % KHDS 06 dispersion) and 0.00167 wt. % nano-scale carbon black and, as colouring agents, 0.0055 wt. % Macrolex Red EG, 0.0039 wt. % Macrolex Blue RR and 0.0013 wt. % Heliogen Blue K6911 D. The results of the reflection measurement are given in Table 2.

Example 13 (Comparison Example)

Makrolon AL2647 is compounded as described above with 0.00452 wt. % lanthanum hexaboride, $LaB_6$ (which corresponds to 0.021 wt. % KHDS 06 dispersion) and 0.0005 wt. % nano-scale carbon black and, as colouring agents, 0.0048 wt. % Macrolex Red EG, 0.0037 wt. % Macrolex Blue RR and 0.0011 wt. % Heliogen Blue K6911D. The results of the reflection measurement are given in Table 2.

Example 14 (According to the Invention)

Makrolon® AL2647 is compounded as described above with 0.00452 wt. % lanthanum hexaboride, $LaB_6$ (which corresponds to 0.021 wt. % KHDS 06 dispersion) and 0.00225 wt. % nano-scale carbon black and, as colouring agents, 0.0048 wt. % Macrolex Red EG, 0.0037 wt. %

Macrolex Blue RR and 0.0011 wt. % Heliogen Blue K6911D. The results of the reflection measurement are given in Table 2.

TABLE 1

Change in the scattering effect by various IR absorber/carbon black combinations

| Example No. | LaB$_6$ [wt. %] | Nano-scale carbon black [wt. %] | b* (60°) | b* (hemi-spherical) | Δ b* | T$_{DS}$ [%] | Light transmission [%] |
|---|---|---|---|---|---|---|---|
| 1 (comparison) | — | — | −0.6 | −0.4 | 0.2 | 84.8 | 88.9 |
| 2 (comparison) | 0.00086 | — | −2.7 | −0.4 | 2.3 | 76.4 | 84.4 |
| 3 (comparison) | 0.00108 | — | −3.2 | 0 | 3.2 | 67.4 | 82.5 |
| 4 (comparison) | 0.00215 | — | −4.8 | 0.4 | 5.2 | 54.0 | 75.5 |
| 5 (comparison) | 0.00430 | — | −6.7 | 0.3 | 7.0 | 36.5 | 62.6 |
| 6 (comparison) | 0.01075 | — | −7.5 | −1.6 | 5.9 | 14.8 | 35.8 |
| 7 (comparison) | 0.02150 | — | −8.0 | −3.4 | 4.6 | 5.0 | 14.8 |
| 8 (comparison) | 0.00430 | 0.00030 | −5.6 | 0.1 | 5.7 | 31.0 | 53.0 |
| 9 (comparison) | 0.00430 | 0.00400 | −1.4 | −1.5 | 0.1 | 6.4 | 5.7 |
| 10 (according to the invention) | 0.00430 | 0.00250 | −2.2 | −1.6 | 0.6 | 11.0 | 14.6 |

It is clear from Examples 2 to 7 that the scattering effect caused by the IR absorber particles increases sharply with the concentration of lanthanum hexaboride. Example 8 shows that small amounts of carbon black are not suitable for markedly shifting the b* (60°) value towards 0 or into a range of from 0 to −2.5. Furthermore, the Δb* value is markedly above 1 and is accordingly clearly visible to the observer. Example 10 shows that only relatively large amounts of carbon black exhibit the desired effect. Furthermore, the difference between the bluish tinge caused by the scattering effect and the reflected inherent colour is no longer discernible (Δb* is less than 1). Too high concentrations of carbon black, as shown in Example 9, drastically reduce the transmission and are not suitable for transparent moulded bodies. Surprisingly, it is also shown that the progression of the b* value (b* (60°)) responsible for the degree of scattering is different from that of the reflected inherent colour (b* (hemispherical)).

TABLE 2

Special colour settings

| | Ex. 11 comparison | Ex. 12 according to the invention | Ex. 13 comparison | Ex. 14 according to the invention |
|---|---|---|---|---|
| Macrolex Red EG [wt. %] | 0.00550 | 0.00550 | 0.00480 | 0.00480 |
| Macrolex Blue RR [wt. %] | 0.00390 | 0.00390 | 0.00370 | 0.00370 |
| Heliogen Blue K 6911D [wt. %] | 0.00130 | 0.00130 | 0.00110 | 0.00110 |
| Nano-scale carbon black [wt. %] | 0.00050 | 0.00167 | 0.00050 | 0.00225 |
| LaB$_6$ [wt. %] | 0.00667 | 0.00667 | 0.00452 | 0.00452 |
| Transmission Ty | 20.1 | 8.1 | 25.5 | 7.8 |
| b* in reflection | −3.2 | −1.7 | −3.2 | −1.3 |
| b* in reflection, hemispherical | −3.1 | −2.3 | −3.2 | −2.0 |
| Δb* | 0.1 | 0.6 | 0.0 | 0.7 |
| T$_{DS}$ [%] | 14.1 | 6.0 | 20.6 | 7.7 |

The scattering effect of the IR absorber particles is also noticeable in the colour formulations. By means of the concentrations according to the invention of nano-scale pigment, as is shown in Examples 12 and 14, it is possible to reduce the scattering effect (which can be recognised by the significant increase in b* (60°) in reflection, i.e. b* moves towards 0). Even though Δb* for Examples 11 to 14 is in the range from 0 to 1 (i.e. the blue component of the inherent colour cannot be distinguished from the component of the scattering effect), the colour of the comparison examples with a b* (60°) outside the desired range is not acceptable for a neutral grey.

The invention claimed is:
1. A finished part comprising a composition comprising
   a. at least one polycarbonate;
   b. at least one inorganic IR absorber comprising at least one boride compound comprises LaB$_6$ present in an amount of from 0.00430 wt. % to 0.00667 wt. %, calculated as solids content of boride in the total polymer composition; and
   c. at least one inorganic, nano-scale pigment comprising carbon black present in an amount of from 0.00167 wt. % to 0.00250 wt. %, based on the total composition; and
   d. optionally further additives, wherein the finished part has a thickness of 4 to 6 mm, and wherein the finished part has a b* (60°) value of from −2.5 to 0.
2. The finished part according to claim 1, wherein the ratio of b) to c) is from 20:1 to 0.4:1.
3. The finished part according to claim 1, wherein the ratio of b) to c) is from 5:1 to 1.5:1.
4. The finished part according to claim 1, wherein the carbon black has a mean particle size of less than 100 nm.
5. The finished part according to claim 1, wherein the composition further comprises triphenylphosphine.
6. The finished part according to claim 1, wherein the composition further comprises at least one additive selected from the group consisting of ultraviolet absorbers, colouring agents, demoulding agents, flameproofing agents and heat stabilizers.
7. An automobile, railway vehicle, aircraft or architectural glazing comprising the finished part according to claim 1.
8. The finished part according to claim 1 having a transmission of at least 6% and a haze of less than 2%.
9. The finished part according to claim 1 wherein the finished part has a thickness of 4 to 6 mm.
10. A method comprising adding carbon black to a polymer composition comprising at least one polycarbonate;
   at least one inorganic IR absorber comprising at least one boride compound comprises LaB$_6$ present in an amount of 0.00430 wt. % to 0.00667 wt. %, calculated as solids content of boride in the total polymer composition; and at least one inorganic, nano-scale pigment present in an amount of from 0.00167 wt.% to 0.00250 wt. %, based on the total composition; and optionally further additives, wherein the scattering caused by the nano-scale particles is reduced, and forming a finished part having a thickness from 4 to 6 mm from the composition, wherein the finished part has a b* (60°) value of from −2.5 to 0.

* * * * *